(No Model.) 2 Sheets—Sheet 1.

O. T. BLÁTHY.
TRANSFORMER MOTOR.

No. 497,113. Patented May 9, 1893.

WITNESSES:
George Baumann
James Gracie

INVENTOR
Otto Titus Bláthy
BY
Howson and Howson
his ATTORNEYS.

(No Model.) 2 Sheets—Sheet 2.
O. T. BLÁTHY.
TRANSFORMER MOTOR.
No. 497,113. Patented May 9, 1893.
FIG. 8.
FIG. 6. FIG. 7.
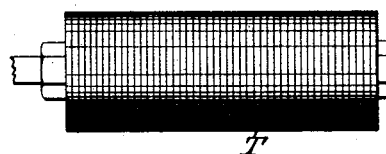
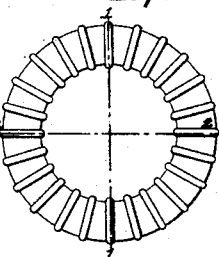
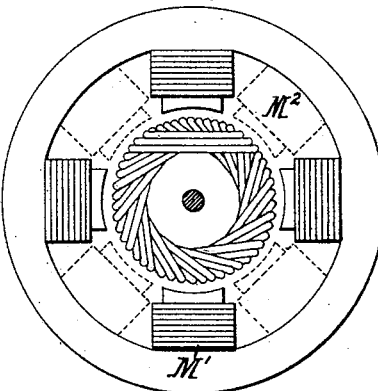
FIG. 9. FIG. 10. FIG. 11.
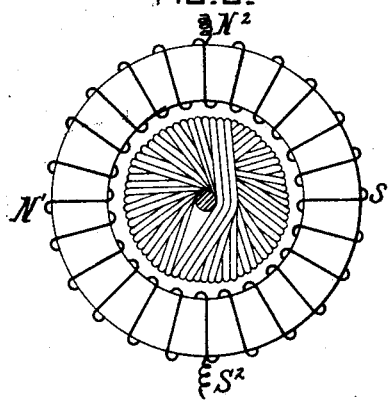
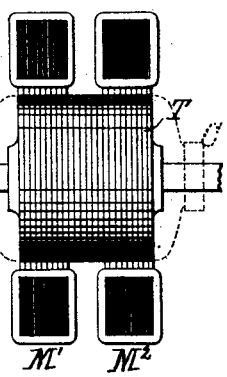
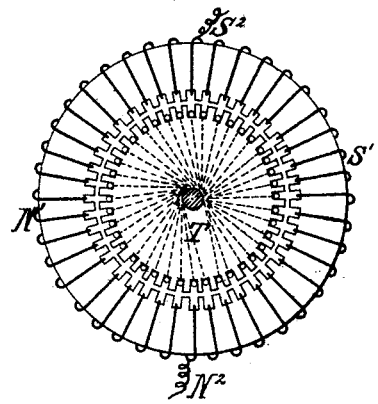
FIG. 12.
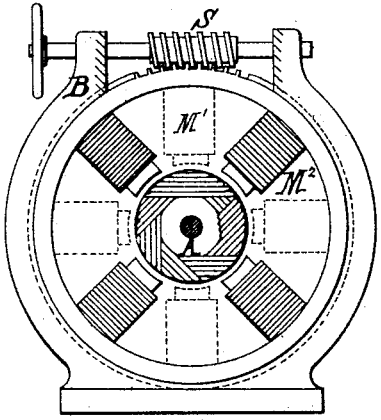
WITNESSES:
George Baumann
James Gracie
INVENTOR
Otto Titus Bláthy
BY
Howson and Howson
his ATTORNEYS.

UNITED STATES PATENT OFFICE.

OTTO TITUS BLÁTHY, OF BUDA-PESTH, AUSTRIA-HUNGARY.

TRANSFORMER-MOTOR.

SPECIFICATION forming part of Letters Patent No. 497,113, dated May 9, 1893.

Application filed March 24, 1891. Serial No. 386,179. (No model.)

*To all whom it may concern:*

Be it known that I, OTTO TITUS BLÁTHY, a subject of the King of Hungary, and a resident of Buda-Pesth, Austria-Hungary, have invented a Transformer-Motor, of which the following is a specification.

This invention consists of an electromotor for alternate currents which may be considered as composed of a transformer and a motor part changing roles periodically.

Figure 1:
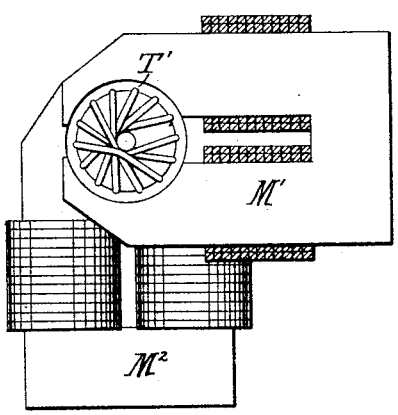
Figure 2:
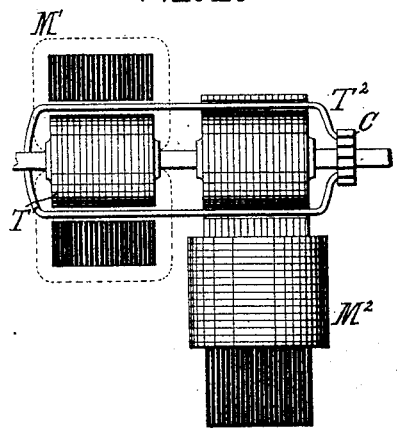

This motor has an armature with coils or windings closed upon themselves, which may also be regarded as composed of two armatures $T'$ $T^2$ in Figures 1 and 2, the coils of which are severally closed upon each other (that is each coil of one half of the armature is closed upon one coil of the second half) and two field magnets $M'$ and $M^2$ excited by two alternate currents displaced in phase from one another, the axes of polarity of these fields forming an angle, without intersecting however.

Figures 4, 5:
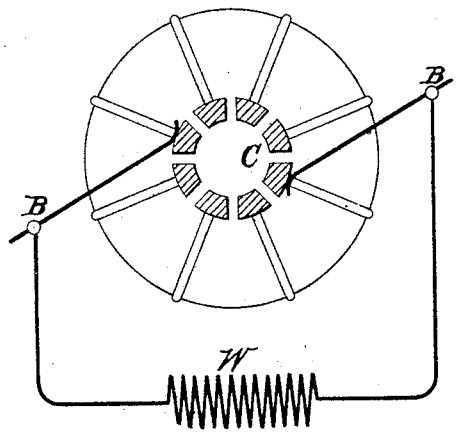
Figure 3:
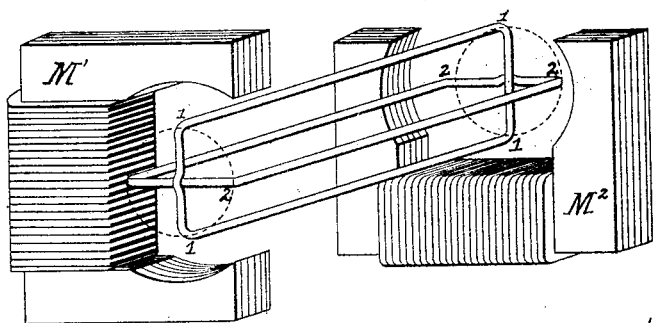

To explain the manner of operation of the motor let us first assume the armature at rest and take in consideration two coils at right angles only, say 1 and 2, Fig. 3. If the current of $M'$, and therefore its magnetization also, is displaced with respect to current and magnetization of $M^2$ for a quarter of a wave in phase as shown in Fig. 4 by the curves $M'$ and $M^2$, then this displacement in phase will exist also between the currents induced by $M'$ in the coil 2 and by $M^2$ in coil 1, respectively (see the dotted lines in Fig. 4). Therefore when the current in coil 1 is at its maximum value, that in 2 will just be zero and vice versa. Besides this the phases of the currents in 1 and 2 being displaced for nearly one quarter of a wave, with respect to the intensities of magnetism in the inducing fields $M^2$ and $M'$, the current induced in one of the coils coincides in phase with the magnetism of the other field and thus a torque will act upon the coil and therefore upon the armature. The torques will also vary accordingly to curves like those of $M'$ and $M^2$ in Fig. 4; the torques on coils 1 and 2 therefore are displaced in phase between themselves by a quarter of a wave and the resulting torque will be nearly constant.

I have chosen the name of transformer-motor to indicate that the two halves of the electro-motor, viz. $M'$ with $T'$ and $M^2$ with $T^2$, form alternately a transformer and a motor.

If the armature is revolving the several coils are successively passing the neutral planes, that is the planes in which there is a maximum current in the coils and maximum torque (in Fig. 3 the two coils 1 and 2 are shown in the neutral planes). Coils which are not in these planes are at the same time submitted to the induction and torque of both the fields; with respect to these coils the apparatus is therefore a transformer and a motor at the same time. Each armature coil should be closed upon itself, but in order to keep the coils or a part of them closed only for a certain interval of time, I provide a commutator C, as shown in Fig. 5, with sectors or segments for each coil, and brushes B connected up with each other through a resistance W.

My motor may be modified in a variety of ways, either by altering the armature alone, or the fields or both.

If the space between $T'$ and $T^2$ be filled up with subdivided iron, the result will be a drum, as shown in Fig. 6. To diminish the magnetic resistance the drum may be provided with channels or slots at its circumference into which the wires are placed, as in the modification, Fig. 11. Instead of a drum a ring with coils may be used, as shown in Fig. 7. The iron core of the drum or ring is subdivided and the windings are fixed in the manner well known in the art.

Both the cores of the field magnets and of the armature must be subdivided in the well-known manner to guard against the generation of so called Foucault currents in the iron masses. The external form of the field magnets admits of a very large number of variations, as nearly all the forms used in dynamo machinery can be adapted to my motor also. The number of poles of each of the two magnet systems may be any even number. Fig. 8 shows as an example a transformer motor with two magnets $M'$ and $M^2$ (the latter one in dotted lines) each with four polar projections and a drum armature T; the several windings on the armature in this case inclose ninety degrees of the circumference only (in each half of the armature). The field magnets shown in Figs. 1 to 8 have polar faces nearer to the armature than any other part of the magnet cores. In Figs. 9 and 10, a form without any projecting poles is shown. The field magnets are formed in two rings wound like Gramme rings so as to have the poles at the ends of a diameter. Such an arrangement with channels for the windings on armature and magnets is shown in Fig. 11. Of course the rings may have instead of two poles each, any even number of poles in this arrangement also.

The angle between the axes of polarity of the field magnets $M'$ and $M^2$ may be ninety degrees or less. In some cases it will be of advantage to make one of the field magnets movable with respect to the other one, as by means such as illustrated in Fig. 12, for instance. The ring frame of one field magnet is mounted in a fixed frame B, so as to be capable of rotary adjustment therein, as by a worm $s$.

Instead of having the axes of polarity of the field magnets forming an angle with one another they may also be arranged parallelly, while one half of each armature coil is distorted for a corresponding angle against the other half of it, but this specific construction forms the subject of my Letters Patent No. 464,671, dated December 8, 1891.

The external form of the field magnets, as well as the amount of the displacement of the phases and the size of the angle at which the field magnets are placed relatively to one another, are not essential features in any of the different variations of my invention.

I claim as my invention—

A transformer motor for alternate currents consisting of two field magnets or groups thereof producing two magnetic fields independent of and not intersecting one another and having their phases displaced relatively to each other, with an armature having coils, a commutator therefor and brushes in a closed circuit containing a resistance, the armature coils being directly acted upon with an alternately inductive and dynamic action by the two field magnets, whose fields pass through the armature at different points, all substantially as described.

In testimony whereof I have signed my name to this specification in the presence of two subscribing witnesses.

OTTO TITUS BLÁTHY.

Witnesses:
HANS KÛRSTEN,
LEOPOLD NEUSTADT.